United States Patent [19]

Urbina-Davalos

[11] 4,016,238
[45] Apr. 5, 1977

[54] PROCESS FOR THE OBTENTION OF ALUMINA AND PHOSPHATE VALUES BY THE ALKALINE DECOMPOSITION OF SILICA-CONTAINING ALUMINUM PHOSPHATE ORES

[76] Inventor: Fernando Urbina-Davalos, Rio Marne No. 14, Mexico 5, D.F., Mexico

[22] Filed: Aug. 29, 1975

[21] Appl. No.: 608,949

[52] U.S. Cl. .............................. 423/119; 423/131; 423/158; 423/183; 423/184; 423/317; 423/321 R; 423/127
[51] Int. Cl.² .................. C01F 7/06; C01B 25/18; C01F 7/14
[58] Field of Search .......... 423/119, 131, 127, 184, 423/158, 317, 321, 183

[56] References Cited
UNITED STATES PATENTS 1,845,876  2/1932  Huber ............................. 423/125

FOREIGN PATENTS OR APPLICATIONS 995       4/1871  United Kingdom ............... 423/119
389,359   3/1933  United Kingdom ............... 423/131

Primary Examiner—Herbert T. Carter
Attorney, Agent, or Firm—Sughrue, Rothwell, Mion, Zinn & Macpeak

[57] ABSTRACT

A process for the obtention of alumina and phosphate values by the alkaline decomposition of silica-containing aluminum phosphate ores comprises reducing the ore to a particle size of from about 6 to 13 mm; calcining the ore at a temperature of from 500° to 750° C in order to remove water of crystallization and combined water; grinding the calcined ore to a particle size of from 20 to 60 mesh (U. S. Sieve); treating the calcined and ground ore with an aqueous solution having a concentration of from 20 to 30% by weight caustic alkali at an initial temperature of from 65° to 75° C; quickly filtering the hot suspension thus obtained to remove the solid silica and heavy metal oxides; adding a 50% caustic alkali solution to the filtrate in an amount sufficient to obtain a total concentration of from 10 to 15% by weight of free caustic alkali; cooling the alkaline liquor accompanied by an elutriation action in an elutriator to a temperature of from 5° to 10° C in order to remove the crystallized tribasic alkali phosphate in the form of hydrated crystals which are recovered from the bottom of the elutriator; recovering the supernatant liquor from the top of the elutriator; heating said liquor to a temperature of 75°–85° C to obtain an alkali aluminate solution; and converting said alkali aluminate solution into hydrated alumina [Al(OH)$_3$] and then into alumina (Al$_2$O$_3$) by known means. The alkaline liquors obtained therefrom are recycled to the alkaline decomposition step after concentration thereof.

The process can be rendered cyclic by converting the tribasic alkali phosphate into phosphoric acid by dissolving the phosphate in water, treating with CaO to form tricalcium phosphate and regenerate the caustic alkali, which is concentrated and recycled to the alkaline decomposition step, recovering the tricalcium phosphate, and reacting the same with sulfuric acid to obtain gypsum and phosphoric acid. The gypsum is reacted with carbon to produce lime and SO$_2$ by known means for use in the process and the SO$_2$ released is converted into sulfuric acid to use in the process.

11 Claims, 1 Drawing Figure

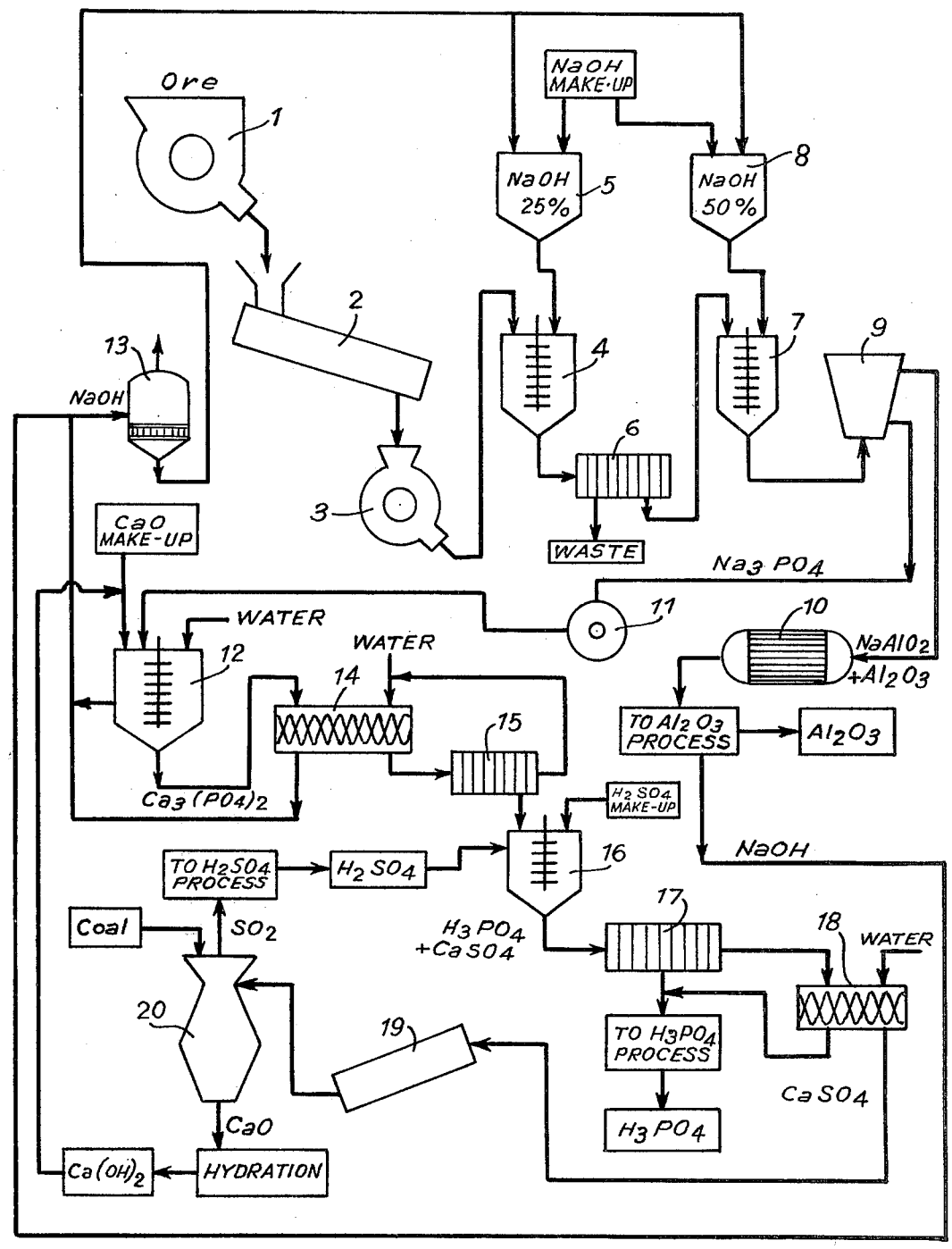

PROCESS FOR THE OBTENTION OF ALUMINA AND PHOSPHATE VALUES BY THE ALKALINE DECOMPOSITION OF SILICA-CONTAINING ALUMINUM PHOSPHATE ORES

BACKGROUND OF THE INVENTION

The present invention relates to a process for the obtention of alumina and phosphate values by the alkaline decomposition of silica-containing aluminum phosphate ores and, more particularly, it refers to a process for the production of alumina and alkali phosphates by a process including a one-step alkaline decomposition of the aluminum phosphate ores.

For long it has been known that it was not possible to decompose native aluminum phosphates, particularly those containing large proportions of silica, by means of decomposition by a caustic alkali in a one-step process, so as to obtain pure alumina and phosphoric acid or phosphates in an industrially utilizable quality.

It has also been for long known that the presence of phosphoric acid has a disturbing influence in the production of alumina from bauxite and similarly the presence of alumina compounds in an ore constitutes a disturbing factor in the production of phosphate salts from aluminum ores. Also, it is a well known fact that the presence of silica in this type of aluminum phosphate ores has a high disturbing action in the obtention of either alumina or phosphate salts, in view of the fact that the alkaline decomposition of these ores generally tends to dissolve silica which thereby seriously contaminates the liquors of the decomposition, in which the aluminum is contained in the form of alkali aluminate and the phosphorus is contained in the form of soluble alkali phosphates.

It was on account of the above reasons that the most commonly utilized method for the decomposition of aluminum phosphate ores containing large proportions of silica, consisted in effecting a reductive decomposition by means of heat and carbon, under which conditions, phosphorus of phosphoric anhydride are obtained, whereupon the aluminum can be recovered, for instance, as cement, in the residual slags of the reduction furnace.

In view of the fact that the dry process for recovering phosphate values as disclosed above was not able to produce pure alumina for further utilization in the aluminum industry, it has been for long desired to devise aa practical wet process for the alkaline treatment of aluminum phosphate ores, with the purpose of recovering the phosphate values and also the alumina for further utilization in the aluminum industry which up to the present date is based mainly on the existence of bauxite, which is a rather scarce mineral against the enormous reserves of aluminum phosphate ores spread out throughout the world.

To the knowledge of applicant, one of the most efficient processes for the wet alkaline treatment of aluminum phosphate ores was devised some 40 years ago by Hans Huber, as disclosed in U.S. Pat. No. 1,845,876, patented Feb. 16, 1932. Huber describes a process by which the aluminum phosphates can be decomposed by boiling with caustic alkali liquors of a rather low concentration such as those used in the alkaline decomposition of bauxite, whereby a liquor is obtained which contains the tribasic alkali phosphate, caustic alkali and alumina in solution. However, as the concentration of the caustic alkali used by Huber is rather low, in order to crystallize the precipitated alkali phosphate thus formed, it would be necessary to concentrate the solution, and Huber very clearly states that if in this first stage of the process, attempts are made to bring about the complete precipitation of the tribasic alkali phosphate, the objective of recovering the aluminum from said solutions would not be otained, because on the one hand a tribasic alkali phosphate which is highly contaminated with alkali aluminate would be deposited and, on the other hand, the amount of alumina recoverable in a single decomposition would be still very low and thus inadequate, mainly due to the fact that a relatively dilute alkali caustic solution is being used for the alkaline decomposition. The manner in which Huber solves this problem is by recycling the mother liquor obtained after merely cooling the warm solution and separating the small amounts of alkali phosphate from said mother liquor, through the process of alkaline decomposition, with the addition of more caustic alkali and ore. By repeating this operation several times, the mother liquors will be enriched in alumina to enable the latter to be economically precipitated without concentration. Therefore, in accordance with Huber, a number of recirculations are necessary and this multiple-step alkaline decomposition process of aluminum phosphate, which present serious drawbacks, more so if it is considered that the concentration of alkali phosphate in the alumina-enriched solution would still be of around 1%, and this alkali phosphate must be priorly precipitated by the use of lime or the like, whereupon the aluminum can then be recovered from the purified mother liquor as aluminum hydrate.

On the other hand, the efficiency of the process for the recovery of the aluminum is rather low and cannot go beyond around 70 to 90% in accordance with Huber, mainly due to the existence of certain amounts of silica in the starting ore, whereby this process cannot be considered as suitable for recovering alumina and phosphate values from an aluminum phosphate ore which contains relatively high proportions of silica, because said silica is dissolved in the caustic alkali solutions in view of the rather long residence time, and thus would seriously contaminate the aluminum liquors from which the alumina is to be recovered. Therefore, the Huber process presents the serious drawbacks of being a rather complicated process which requires a multiple-step decomposition process and, also, is not suitable for treating aluminum phosphate ores containing relatively high proportions of silica, because the higher the proportion of silica, the lower the recovery of alumina from these mother liquors.

From the above discussion of the prior art processes for the treatment of alkali phosphate ores containing relatively high proportions of silica, it can be concluded that the problem of economically obtaining phosphate values and alumina conjointly from these mineral ores has not yet been solved and that therefore the modern industry still calls for an economical and practical process which may enable the use of the highly abundant aluminum phosphate ores instead of the rather scarce bauxite.

BRIEF SUMMARY OF THE INVENTION

Having in mind the defects of the prior art processes for the recovery of phosphate values and alumina by the alkaline decomposition of silica-containing aluminum phosphate ores, it is an object of the present invention to provide a process for effecting such recovery efficiently, and which will permit the use as a starting material or an aluminum phosphate ore containing relatively high proportions of silica.

Another object of the present invention is to provide an improved process for the recovery of alumina and phosphate values from a silica-containing aluminum phosphate ore by means of a process involving a one-step alkaline decomposition of the ore, which process will prevent the necessity of any recirculation of the alkaline mother liquors.

A more particular object of the present invention is to provide an improved process for the recovery of alumina and phosphate values from a silica-containing aluminum phosphate ore, of the above described character, which will prevent any appreciable dissolution of the silica contained in the ore and will thus prevent any contamination of the alumina.

It is still a further and more specific object of the present invention to provide an improved process for the recovery of alumina and phosphate values from a silica-containing aluminum phosphate ore of the above-described character, which will permit crystallization of practically the whole of the tribasic alkali phosphate from the mother liquor of the alkaline decomposition, and which will therefore leave a mother liquor containing practically pure aluminum values.

A still further and more specific object of the present invention is to provide an improved process for the recovery of alumina and phosphate values from a silica-containing aluminum phosphate ore, of the above described characteristics, which will be cyclic in nature thus furnishing the needs of reactants in the process and which will therefore require only replenishing of said reactants to render it highly economic in nature.

The foregoing objects and others ancillary thereto aare preferably accomplished as follows: According to a preferred embodiment of the present invention, the silica-containing aluminum-phosphate ores are reduced to a particle size of from about 6 to 13 mm and are thereafter calcined and comminuted down to a particle size of from about 20 to 60 mesh (U.S. Sieve), in order to render said ores highly active against the caustic alkali to be used in the alkaline decomposition thereof. The calcined and ground ore is thereafter treated with a concentrated aqueous solution of an alkali in order to effect a very energetic alkaline decomposition reaction which is sufficiently fast to prevent andy dissolution of the silica extant in the starting material, and the caustic liquor is thereafter quickly filtered to remove the solid silica and iron and other heavy metal oxides.

In order to enable direct crystallization of practically the whole of the tribasic alkali phosphates formed by the alkaline treatment, the filtrate is treated with more caustic alkali solution in order to permit a common ion effect, and the liquor is thereafter cooled to crystallize the alkali tribasic phosphate in the form of hydrated crystals which are practically totally precipitated and recovered through the use of an elutriation process in which the ascending velocity of the liquor, preferably of the order of from 2.0 to 3.5 cm/min at the bottom of the elutriator and of from 0.1 to 0.3 cm/min at the top of the elutriator, prevents precipitation to the bottom of the elutriator of the very fine microcrystals of the alumina trihydrate formed in the cooling process. This will produce a practically pure alkali aluminate solution which can be used to produce alumina by known methods and will produce practically pure crystals of the alkali phosphate, which can be used for the production by known methods of phosphoric acid.

BRIEF DESCRIPTION OF THE DRAWING

The novel features that are considered characteristic of the present invention are set forth with particularity in the appended claims. The invention itself, however, both as to its organization and its method of operation, together with additional objects and advantages thereof, will best be understood from the following description of certain specific embodiments, when read in connection with the accompanying drawing, in which:

The single FIGURE is a diagramatic flow sheet of a cyclic process for the obtention of alumina and phosphoric acid from silica-containing aluminum phosphate ores in accordance with a preferred embodiment of the present invention.

DETAILED DESCRIPTION

In accordance with the process of the present invention, the silica-containing aluminum phosphate ore is firstly broken down to a particle size of from 6 to 13 mm (¼ inch to ½ inch) and is calcined for a period of from 30 to 60 minutes at a temperature of at least 500° C in order to remove all the water of crystallization and the combined water of the aluminum phosphates contained in the treated ore. The calcined ore is ground to a particle size within the range of from 20 to 60 mesh (U.S. Sieve) whereupon it is ready to be subjected to an alkaline attack by means of a relatively concentrated aqueous caustic alkali solution.

It has been surprisingly found out that by so calcining the aluminum phosphate ore, the aluminum phosphate contents thereof are highly activated towards reaction with a concentrated caustic alkali solution, whereas the silica contents thereof are not so activated, whereby this prior calcination of the aluminum phosphate ore favors a fast chemical attack by the caustic alkali solutions, which will prevent or at least minimize the possibility that the alkaline liquors, under the conditions of the initial phase of the process may dissolve any siliceous matter contained in the thus treated minerals. This, together with the fact that the calcined ore is ground to a size of from 20 to 60 mesh, prevents the chemical attack and partial dissolution of the silica contained in the ore, which permits successfully to use ores with high silica contents without any appreciable loss of alumina as was commonplace in all the prior art process.

The thus obtained calcined and ground aluminum phosphate ore is subjected to an alkaline attack with a caustic alkali lye, such as a sodium hydroxide or potassium hydroxide lye having a concentration of from about 20 to about 30% by weight and which may contain variable amounts of sodium aluminate and trisodium phosphate derived from the recycling of the recovered alkaline solutions in the process itself, as will be described more fully hereinafter. The initial temperature of the reaction mixture is of from 65° to 75° C and the reaction is effected very quickly, that is, for a period of from about 1 to 1.5 minutes, the temperature of the reaction mixture being autogenously raised to a temperature of from about 90° to 95° C in view of the fact that said reaction is exothermic in nature.

The use of a relatively concentrated caustic alkali lye, plus the fact that the aluminum phosphate contents of the starting ore have been previously activated by the calcining operation, permits the dissolution of practically the whole of the aluminum contents of said ore, contrary to the processes of the prior art in which the caustic liquor has to be recylced several times in order to enrich it in aluminum values. Also, the fact that the reaction is effected very quickly, added to the fact that the silica content of the ore has not been activated by the prior calcining operation, permits to obtain an alkali aluminate liquor which contains the whole of the phosphate values dissolved in the form of alkali phosphates, practically free from any silica as well as iron oxide and other heavy metal oxides, which will remain in the solid residue.

In order to prevent a long residence time of the silica content of the aluminum phosphate ore in this alkaline solution, the suspension formed by the liquor containing the whole of the phosphate values and the aluminum values dissolved and the solid residue which was not attacked by the caustic alkali and which contains practically the whole of the silica and the iron and other heavy metal oxides contained in the starting ore, is filtered in a very short time, through the use of a suitable filter, and the filter cake is washed countercurrently with a diluted caustic alkali solution, at a temperature of from about 80° to 85° C, which secures the total recovery of the sodium aluminate and phosphate and a complete removal as a solid of the silica content and iron oxide contents of the starting ore.

While the mixture of the filtrates and the washings can be immediately cooled in order to crystallize the alkali phosphates contained therein, it is also an important feature of the present invention to provide for practically quantitative precipitation of said alkali phosphate, for which purpose a common ion effect is caused by the addition of more caustic alkali to the liquor, so as to shift the precipitation reaction towards the more insoluble compound, namely, the alkali phosphate as compared to the caustic alkali. For this purpose, the filtrate, together with the washings, as recovered in the filtration step, and still at a temperature of from about 80° to 85° C, are enriched in caustic alkali by the addition of a caustic alkali lye having a concentration of at least 50% of free caustic alkali and in an amount sufficient to give a total concentration of free caustic alkali in the liquor of the order of from about 10 to 15% by weight. This enriched liquor is then subjected to a cooling step in an elutriator to provide for an ascending movement of the liquor, at an initial ascending speed of from 2.0 to 3.5 cm/min and at an end ascending speed of from 0.1 to 0.3 cm/min, in order to crystallize and remove substantially quantitatively the tribasic alkali phosphate contained in said liquor, the liquor being cooled in the elutriator to a final temperature of from about 5 to 10° C. As the cooling and elutriation step is effected countercurrently, the crystals of $M_2PO_4.12H_2O.¼MOH$ (with M being an alkali metal) are concentrated in the bottom of the elutriator, and are removed in the form of a crystallizate which is passed to a centrifuge to recover and wash the tribasic alkali phosphate thus obtained. The decanted liquor is removed from the top of the crystallization device or elutriator, and contains the whole of the alkali aluminate formed by the alkaline treatment, practically free from the tribasic alkali phosphate and with the alkali aluminate being partially hydrolized which originates microcrystals of $Al_2O_3.3H_2O$.

It has been discovered that the addition of the 50% caustic alkali lye to the hot liquor obtained from the filtration step, in order to provide a concentration of from about 10 to 15% by weight of the free caustic alkali in said liquor, permits a strict control of the partial hydrolysis of the alkali aluminate in the cooling process and produces crystals of $M_3PO_4.12H_2O.¼MOH$, which are fully recoverable by centrifugation, leaving negligible amounts of tribasic alkali phosphate in the residual liquor when the final temperature which must be preferably of the order of from 5 to 10° is reached, by the common ion effect exerted by the addition of said caustic alkali.

The cooling process effected, aided by the elutriation process, prevents the microcrystals of $Al_2O_3.3H_2O$ produced by the controlled partial hydrolysis of the alkali aluminate to contaminate the tribasic alkali phosphate crystals which are formed during cooling of the liquor, whereby highly pure crystals of the alkali phosphate are obtained and a highly pure alkali aluminate solution is also recovered from this crystallization process.

It will thus be clearly seen that these crystals of the tribasic alkali phosphate can be used thereafter for any purpose and constitute a fully recovered phosphate value from the original ore.

The liquor discharged from the elutriator is again heated to a temperature of from about 75° to 85° C, at which temperature, in view of the controlled excess of caustic alkali, the microcrystals of $Al_2O_3.3H_2O$ will be redissolved and will form a solution in which the totality of the alumina will be in the form of the alkali aluminate. This solution, therefore, is in condition to be immediately subjected to a well-known process for the production of hydrated alumina ($Al(OH)_3$) which may be furtherly converted by calcination into metallurgical grade alumina ($Al_2O_3$).

In order to render the process of the present invention fully cyclic, that is, in order to provide the reactants required in the same process, it is a preferred embodiment of this invention to carry out the following steps in addition to the above-described steps which form the gist of the present invention.

The crystals of $M_3PO_4.12H_2O.¼MOH$ are dissolved in an amount of hot water to provide a concentration of from 18 to 22% by weight of the tribasic alkaline phosphate. This liquor is treated with a stoichiometric amount of calcium hydroxide in the form of lime or of a highly concentrated hydrated lime, maintaining the temperature of the liquor between abotut 70° to 80° C. The reaction is effected for a period of from 2 to 3 hours, and the addition of the calcium hydroxide is effected at a very slow rate and maintaining the stirring and temperature conditions which may be considered as more suitable to provide for the production of a maximum size of crystals of tricalcium phosphate of the formula $Ca_3PO_4.Ca(OH)_2$ which is formed in this caustification reaction, which is very well known. This reaction will produce an amount of the caustic alkali which will be equivalent to the tribasic alkali phosphate precipitated and the dilution conditions are selected at the start of this stage to produce an alkaline liquor having from about 12 to 15% by weight of free caustic alkali, which liquor can be recycled to the alkaline attack step, the yield of conversion of the alkali phosphate into the caustic alkali being from 85 to 90%.

The suspension obtained in the above step is subjected to a countercurrent washing operation, which is effected in three settling units and the concentrated slurry is removed from the end settler and is fed to a rotary filter wherein the precipitated $Ca_3PO_4.Ca(OH)_2$ is subjected to a final washing. The liquor obtained in this filter is recycled to the settler system, and water for effecting the washings is calculated so that the liquor from the first settler will have a concentration of from abotut 10 to 12% of the free caustic alkali, which solution is also recycled to the alkaline attack step, upon concentration thereof.

The tricalcium phosphate obtained in the above step, which is highly pure in view of the process followed, is treated with sulfuric acid by any known process, in order to obtain phosphoric acid and gypsum ($CaSO_4 \cdot 2H_2O$) which is removed from the phosphoric acid solution by filtration, thereby obtaining a phosphoric acid of a concentration of from 40 to 42% of $P_2O_5$. The phosphoric acid thus obtained shows a great purity and meets the specifications corresponding to technical grade phosphoric acid.

The phosphoric acid thus obtained may be subjected to a concentration process in order to produce superphosphoric acid of a concentration of from 75 to 79% of $P_2O_5$.

The gypsum obtained in the above step, is dehydrated and subjected to calcination with coal in a suitable reduction furnace, in order to reduce the same to produce $SO_2$ and high purity calcium oxide. The $SO_2$ is fed to a contact sulfuric acid plant which is very well known in the prior art, in order to produce the sulfuric acid necessary in the manufacture of the phosphoric acid mentioned above, and the calcium oxide is used in the tribasic alkali phosphate precipitation step also described above.

As mentioned above, all the alkaline liquors recovered are joined and concentrated in a multiple effect evaporator, in order to increase its caustic alkali concentration up to a range of from about 20 to 30% as is necessary for using said liquors in the alkaline treatment of the starting ore, or to 50% as is necessary for using in carrying out the common ion effect in the alkaline liquor. This caustic lye will of course contain variable amounts of $Al_2O_3$ and $P_2O_5$ derived from the respective recovery steps, but which will not affect the efficiency of the alkaline treatment of the starting ore.

While any caustic alkali will be suitable for carrying out the above-described process, sodium hydroxide is preferred in view of the availability and low cost thereof.

The present invention will be more fully understood by having reference to the following specific examples, which will be described in connection with the accompanying drawing and which must be considered as strictly illustrative and not limitative of the scope of the present invention.

EXAMPLE 1

Obtention of alumina and trisodium phosphate 100 kg. of a silica-containing aluminum phosphate ore of the following composition:

$Al_2O_3$ — 25%
$P_2O_5$ — 30%
$SiO_2$ — 19%
$Fe_2O_3$ — 6%
$H_2O$ — 20% are fed to a breaker 1 wherein its particle size is reduced down to about 10 mm, and are then subjected to calcination in a furnace 2, at a temperature of 600° C, whereupon the calcined ore is comminuted in a mill 3 to reduce its particle size to 40 mesh (U.S. Sieve). 80 kg. of calcined material having the following composition:

$Al_2O_3$ — 31.2%
$P_2O_5$ — 37.5%
$SiO_2$ — 23.8%
$Fe_2O_3$ — 7.5% are thereby produced and are treated in a reactor 4 with 300 kg. of a recirculation caustic soda lye stored in a reservoir 5, said lye having a concentration of 25% free NaOH, at a temperature of 65° C. This lye also contains 5.5% of $Al_2O_3$ and 3% of $P_2O_5$ derived from the recovery steps of caustic liquors in the process. The reaction is carried out in a period of 1 minute and the temperature is autogenously raised up to 92° C. The composition of the thus resulting suspension is:

$NaAlO_2$ — 16.1% — 67.0 kg.
$Na_3PO_4$ — 21.5% — 90.0 kg.
NaOH (free) — 1.2% — 5.0 kg.
$SiO_2$ — 4.6% — 19.0 kg.
$Fe_2O_3$ — 1.4% — 6.0 kg.
$H_2O$ — 55.2% — 230.0 kg.

The suspension is filtered through the filter 6 and is washed with 50 kg. of a 1% caustic soda solution, to thereby obtain 25 kg. of a solid gangue containing the whole of the silica and iron oxides originally contained in the starting ore, and 425 kg. of filtrate having a composition as follows:

$NaAlO_2$ — 15.1% — 67.0 kg.
$Na_3PO_4$ — 20.3% — 90.0 kg.
NaOH (free) — 1.3% — 6.0 kg.
$H_2O$ — 63.3% — 280.0 kg.

To this filtrate in a tank 7 are added 63 kg. of a 50% caustic soda aqueous solution contained in a reservoir 8 and the caustic soda-enriched liquor is passed to the elutriator 9, in which the temperature of the liquor which is initially at 82° C, is reduced to 10° C. The crystallization in elutriator 9 is effected by feeding the liquor such that it is provided with an ascending movement at an initial speed of 2.85 cm/min and at an end speed of 0.23 cm/min. This operation removes from the liquor and produces 212 kg. of $Na_3PO_4 \cdot 12H_2O \cdot \frac{1}{4}NaOH$ crystals and 276 kg. of a sodium aluminate liquor having the following composition:

$NaAlO_2$ — 23.0% — 66.9 kg.
NaOH (free) — 10.6% — 30.8 kg.
$H_2O$ — 66.3% — 193.0 kg.
$Na_3PO_4$ — 0.1% — 0.3 kg.

A portion of the sodium aluminate will have suffered a partial hydrolysis, whereby some of it will be found in the form of $Al_2O_3 \cdot 3H_2O$ microcrystals, which will of course increase the amount of free NaOH, equivalent to the hydrolyzed sodium aluminate.

The liquor from the elutriator 9, containing practically the whole of the alumina, part of it in the form of $NaAlO_2$ in solution and part of it in the form of $Al_2O_3 \cdot 3H_2O$ microcrystals, is heated in a heat exchanger 10 to a temperature of 85° C, in order to completely shift the hydrolytic equilibrium, to thereby solubilize all of the $Al_2O_3 \cdot 3H_2O$ microcrystals and form more $NaAlO_2$.

The green liquor thus obtained is then subjected to a very well-known process for the obtention of alumina, with the regeneration of amounts of caustic soda liquor which is recycled to the process.

The 212 kg. of $Na_3PO_4 \cdot 12H_2O \cdot \frac{1}{4}NaOH$ crystals are thereafter filtered and washed in the centrifuge 11 to thereby produce a corresponding amount of a pure precipitate.

EXAMPLE 2

Obtention of phosphoric acid

The 212 kg. of crystals of $Na_3PO_4.12H_2O.\frac{1}{4}NaOH$ obtained in the process of example 1, are dissolved in 263 kg. of water at a temperature of 65° C in a suitable tank 12 and 38.5 kg. of lime (calcium oxide) are slowly added for a period of from 2 to 3 hours. Upon completion of the addition of lime, the stirring is continued for about 1 additional hour in order to favor the growth of crystals of the $Ca_3(PO_4).Ca(OH)_2$ formed in this caustification reaction, and the temperature is maintained at 82° C.

Upon completion of the reaction the liquor is decanted and the precipitate is washed countercurrently, for instance, in a washer 14, and is finally filtered in a filter 15 to thereby obtain a pure precipitate of $Ca_3(PO_4).Ca(OH)_2$ with a yield of about 78%.

82 kg. of tricalcium phosphate precipitate are thus formed and 400 kg. of a liquor having the following composition:

NaOH — 10.9% — 49.0 kg.
$Na_3PO_4$ — 4.5% — 20.0 kg.
$H_2O$ — 84.6% — 381.0 kg.

which liquor is recycled through the evaporator 13 to caustic soda storage tanks 5 and 8, to be reused in the alkaline treatment of the starting ore and in the common ion effect operation, respectively.

The 82 kg. of precipitated phosphate are treated with 86 kg. of 98% sulfuric acid in a reactor 16 by means of a very well known process, in order to produce 72 kg. of phosphoric acid having a concentration of 42% $P_2O_5$ and with characteristics which render the same a technical grade phosphoric acid in view of the purity of the phosphate compound treated in this stage of the process.

The gypsum ($CaSO_4.2H_2O$) formed in this step is filtered from the phosphoric acid liquor in filter 17, from which the filtrate is sent to the phosphoric acid purification process to obtain technical grade phosphoric acid, and the removed gypsum is washed with water in a washer 18, in order to obtain a calcium sulfate which is thereafter dried in dryer 19 and calcined in a reduction furnace 20 with coal, in order to produce, at a temperature of about 1100° C, gaseous $SO_2$ and CaO. The $SO_2$ gas is sent to a sulfuric acid contact process plant to produce sulfuric acid which is used in reactor 16, whereas the calcium oxide produced is sent to a hydration plant in order to produce hydrated lime which may be used in reactor 12.

It will be seen from the above that a highly efficient process for the obtention of alumina and phosphate values by the alkaline treatment of aluminum phosphate ores has been provided by the present invention, in which the higher concentration of the caustic alkali liquor used to treat the aluminum phosphate ore, permits the conversion of the whole content of alumina in the ore in order to effect the process in one single step and not by means of successive alkaline attacks as was necessary in accordance with the prior art. The fastness of the reaction, achieved by previously calcining the ore and grinding the same down to a particle size as specified above, permits the use of aluminum phosphate ores with high silica contents, without running the risk of dissolving appreciable amounts of the silica which would unduly contaminate the alumina to be obtained.

The process, on the other hand, can be rendered cyclic by means of the addition of well-known steps in order to regenerate the reactants used in the different steps of the process, whereby it will only be necessary to replenish said reactants in a proportion of from about 1 to 2% of the caustic alkali, about 10 to 12% of the sulfuric acid and about 10 to 12% of the lime, whereby the ultimate consumption of these reactants is minimized.

It has also been discovered that by the use of the method of the present invention, silica-containing aluminum phosphate ores having silica concentrations as high as from 25 to 35% can be easily used without affecting at all the efficiency of recovery of the alumina contained in said ores.

Also, the process of the present invention permits the use of high concentrations in the caustic alkali liquor for attacking the starting ore, with the advantages that an alkali aluminate liquor is obtained having a suitable concentration, on account of the fact that said alkaline liquor strips practically the whole of the alumina from the starting ore in one single step.

The further addition of caustic alkali to exert the common ion effect on the solution from which crystallization of the tribasic alkali phosphate is crystallized, results in a very low contamination of the alumina with the phosphates and of the phosphates with the alumina, when these products are separated with the aid of an elutriation process as described above.

Although certain specific embodiments of the present invention have been shown and described above, it is to be understood that many modifications thereof are possible. The present invention, therefore, is not to be restricted except insofar as is necessitiated by the prior art and by the spirit of the appended claims.

What is claimed is:

1. A process for the alkaline treatment of silica-containing aluminum phosphate ores for the recovery of alumina and phosphate values therefrom, which comprises in combination the steps of:
    a. calcining the ore at a temperature of at least 500° C;
    b. grinding the calcined ore down to a particle size of from 20 to 60 mesh (U.S. Sieve);
    c. treating the calcined and ground ore with a caustic alkali lye having a concentration of at least 20% by weight of free caustic alkali to produce a suspension containing solid silica, iron oxide and other heavy metal oxides;
    d. quickly filtering the suspension thus obtained to remove the solid silica and other heavy metal oxides originally contained in the ore;
    e. adding a concentrated caustic alkali lye of at least 50% free caustic alkali concentration to the filtrate, in an amount sufficient to obtain a total concentration of from 10 to 15% by weight of free caustic alkali in the liquor;
    f. cooling the alkaline liquor with the aid of an elutriation action to crystallize the tribasic alkali phosphate;
    g. removing the thusly crystallized tribasic alkali phosphate; and
    h. recovering a practically pure sodium aluminate aqueous solution which is thereafter coverted into alumina.

2. A process according to claim 1 wherein said silica-containing aluminum phosphate ore is reduced to a particle size of from about 6 to about 13 mm prior to calcining thereof.

3. A process according to claim 2 wherein the ore is calcined at a temperature of from about 500 to about 750° C.

4. A process according to claim 3 wherein the calcined ore is treated with a caustic alkali solution having a concentration of from about 20 to about 30% by weight of free caustic alkali at an initial temperature of from about 65° to about 75° C. and for a period of time of from about 1 to 1.5 minutes.

5. A process according to claim 4 wherein the tribasic alkali phosphate is crystallized by cooling the said alkaline liquor to a temperature of from about 5° to about 10° C.

6. A process according to claim 5 wherein said crystallized tribasic alkali phosphate is removed from the liquor by elutriation at an ascending flow rate such that the suspension is provided with an initial speed of from about 2.0 to 3.5 cm/min and an end speed of from 0.1 to 0.3 cm/min.

7. A process according to claim 6 wherein the alkali aluminate liquor is heated to a temperature of from about 75° to about 85° C prior to treating the same for obtaining alumina therefrom.

8. A process according to claim 1 including the additional steps wherein caustic alkali is recovered from the alumina process and is recycled to the alkaline treatment step upon concentration thereof.

9. A process according to claim 1 including the additional steps of dissolving the tribasic alkali phosphate in water, treating the same with lime to form tricalcium phosphate and to regenerate the caustic alkali; recycling the caustic alkali solution thus obtained to the alkali treatment step of the ore upon concentration thereof; recovering the tricalcium phosphate from the liquor; reacting the same with sulfuric acid to obtain gypsum and phosphoric acid; reducing the gypsum by means of coal into lime for reutilization in the process with the production of sulfur dioxide; and using said sulfur dioxide to obtain sulfuric acid for use in the process, the lime obtained in the reduction step being also reused in the process to treat the phosphate solution.

10. A process according to claim 1 wherein said silica-containing aluminum phosphate ore contains from about 25% to about 35% of silica.

11. A process for the obtention of alumina and phosphoric acid by the alkaline decomposition of silica-containing aluminum phosphate ores which comprises reducing the ore to a particle size of from about 6 to 13mm; calcining the ore at a temperature of from about 500° to about 750° C to remove water of crystallization and combined water therefrom; grinding the calcined ore to a particle size of from 20 to 60 mesh (U.S. Sieve); treating the calcined and ground ore with a caustic alkali aqueous solution having a concentration of from 20 to 30% by weight free caustic alkali plus small amounts of aluminum and phosphorus compounds derived from the recovery of the caustic liquors in the process, at a temperature of from about 65° to 75° C and for a period of time of from 1 to 1.5 minutes to produce a suspension containing solid silica, iron oxide and other heavy metal oxides; quickly filtering the hot suspension thus obtained to remove the solid silica and iron oxide and other heavy metal oxides, adding a 50% caustic alkali solution to the filtrate in an amount sufficient to obtain a total concentration of from 10 to 15% by weight of free caustic alkali; cooling the alkaline liquor in an elutriator to a temperature of from 5° to 10° C to remove the crystallized tribasic alkali phosphate in the form of hydrated crystals which are recovered from the bottom of the elutriator; recovering the supernatant liquor from the top of the elutriator, which contains most of the aluminum in the form of dissolved alkali aluminate and a small amount in the form of microcrystals of $Al_2O_3.3H_2O$; heating said liquor to a temperature of from about 75° to 85° C to redissolve the $Al_2O_3.3H_2O$ into alkali aluminate; coverting said alkali aluminate solution into hydrated alumina and then into alumina; recycling the alkaline liquors obtained from the alumina process to the alkaline decomposition step upon concentration thereof; filtering the tribasic alkali phosphate hydrated crystals recovered from the elutriator; redissolving said tribasic alkali phosphate in water; treating the solution with lime in stoichiometric amounts to form tricalcium phosphate and to regenerate the caustic alkali in the form of an alkaline liquor which is concentrated and recycled to the alkaline treatment step; recovering the tricalcium phosphate; reacting the same with sulfuric acid to obtain gypsum and phosphoric acid which is thereafter purified; reducing the gypsum by means of coal into lime and sulfur dioxide; recycling the lime to the process for treating more tribasic alkali phosphate; and converting the sulfur dioxide into sulfuric acid for use in the treatment of more tribasic alkaline phosphate.

* * * * *